US007397484B2

(12) United States Patent
Chang et al.

(10) Patent No.: US 7,397,484 B2
(45) Date of Patent: Jul. 8, 2008

(54) METHOD FOR DISPLAYING AN IMAGE

(75) Inventors: Wei-Chih Chang, Hsinchu Hsien (TW); Li-Sen Chuang, Penghu (TW); Dai-Liang Ting, Hsinchu (TW)

(73) Assignee: TPO Displays Corp. (TW)

( * ) Notice: Subject to any disclaimer, the term of this patent is extended or adjusted under 35 U.S.C. 154(b) by 570 days.

(21) Appl. No.: 11/032,810

(22) Filed: Jan. 11, 2005

(65) Prior Publication Data

US 2006/0152534 A1 Jul. 13, 2006

(51) Int. Cl.
*G09G 5/02* (2006.01)
*H04N 9/47* (2006.01)

(52) U.S. Cl. .......................... 345/690; 345/22; 345/88; 345/593; 348/503; 348/527; 348/742

(58) Field of Classification Search .................. 345/10, 345/22, 84, 87, 88, 102, 204, 690, 581, 589, 345/593; 348/500, 503, 525, 526, 527, 739, 348/742
See application file for complete search history.

(56) References Cited

U.S. PATENT DOCUMENTS

| | | | | |
|---|---|---|---|---|
| 6,147,792 | A * | 11/2000 | Jones et al. | 359/320 |
| 6,570,554 | B1 * | 5/2003 | Makino et al. | 345/102 |
| 6,573,882 | B1 * | 6/2003 | Takabayashi | 345/102 |
| 6,762,743 | B2 | 7/2004 | Yoshihara et al. | |
| 6,911,963 | B2 * | 6/2005 | Baba et al. | 345/88 |

* cited by examiner

*Primary Examiner*—My-Chau T. Tran
(74) *Attorney, Agent, or Firm*—MH2 Technology Law Group LLP

(57) ABSTRACT

A method of displaying an image including receiving a plurality of corresponding to an image data, wherein each of the plurality of frames includes a plurality of color sub-frames; sequentially displaying the color sub-frames corresponding to a first frame in a first color sequence over time; and displaying the sub-frames corresponding to a second frame following the first frame in a second color sequence over time, wherein the first color sequence is different from the second color sequence.

15 Claims, 4 Drawing Sheets

METHOD FOR DISPLAYING AN IMAGE

DESCRIPTION OF THE INVENTION

1. Field of the Invention

The present invention relates to imaging displays. More particularly, the present invention relates to a method of improving the color break up phenomenon in field-sequential color display.

2. Background of the Invention

In field-sequential color display, each frame or field is temporarily divided into three or more color-separated sub-frames. By sequentially displaying these red, green, and blue sub-frames fast enough, a full color image is perceived. With field-sequential display, it is possible to obtain large spatial resolution in a small and thin size device at a low cost. FIG. 1 shows a conventional field-sequential color image display apparatus wherein red, green, and blue monochromatic images are displayed in the sequence, where R1 and R2 are red sub-frames, G1 and G2 are green sub-frames, and B1 and B2 are blue sub-frames. R1, G1, and B1 sub-frames together constitute one frame or field, and R2, G2, and B2 sub-frames constitute the next frame or field.

An example of a color sequence for displaying an image over time in the field-sequential color display is "RGB RGB RGB . . . . " However, color artifacts will be observed on field-sequential displays. For example, color breakup (CBU) is an artifact where the different sub-frame colors are observed separately. CBU would occur both in stationary and moving images. One reason for CBU may be that saccadic suppression inhibits signals from the eyes to the brain during saccades.

For example, as shown in FIG. 2, when the observation point is moved over time, the problem of color breakup may occur due to the color sequence. For example, in FIG. 2 the color sequence for displaying an image over time in the field-sequential color display is "RGB RGB RGB . . . ", wherein R is a red sub-frame, G is a green sub-frame, and B is a blue sub-frame. In this way, using a white image as an example, when a white image is required to be displayed, the white image 210 observed from the moving observation point has blue (B) color and combination color of blue (B) and green (G) at one edge of the white image and red (R) color and combination color of red (R) and green (G) at the other edge. This is an example of color breakup.

There are some conventional ways to reduce the color breakup effect. One is to increase the frame rate to 75 HZ, for example, and another is to increase the blanking time between sub-frames. A further conventional method for solving the problem is disclosed in U.S. Pat. No. 6,762,743, to Yoshihara et al. entitled "Display device employing a field-sequential method." In the proposed method, one determines whether the display data is motion picture data or still picture data. The frame number per second is increased for the display of a motion picture. As such, color breakup easily occurs by the movement of the line of sight of a user. The number of frames per second is decreased for the display of still picture data because color breakup may not occur.

SUMMARY OF THE INVENTION

In accordance with the invention, there is provided a method of displaying an image including receiving a plurality of frames corresponding to an image data, wherein each of the plurality of frames includes a plurality of color sub-frames; sequentially displaying the color sub-frames corresponding to a first frame in a first color sequence over time; and displaying the sub-frames corresponding to a second frame following the first frame in a second color sequence over time, wherein the first color sequence is different from the second color sequence.

In an embodiment, there is provided a method for improving color breakup comprising sequentially displaying a plurality of frames in a field-sequential color display, each frame comprising a red sub-frame, a blue sub-frame, and a green sub-frame, wherein the color sub-frames in each frame are displayed in a random color sequence.

In an embodiment, there is provided a method for improving color breakup comprising sequentially displaying a plurality of frames in a field-sequential color display, each frame comprising a red sub-frame, a blue sub-frame, and a green sub-frame, wherein the color sub-frames in each frame are displayed in a predetermined color sequence.

Additional advantages will be set forth in part in the description which follows, and in part will be obvious from the description, or may be learned by practice. The advantages will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one (several) embodiment(s) of the invention and together with the description, serve to explain the principles of the disclosure.

DESCRIPTION OF THE EMBODIMENTS

Figure 1:
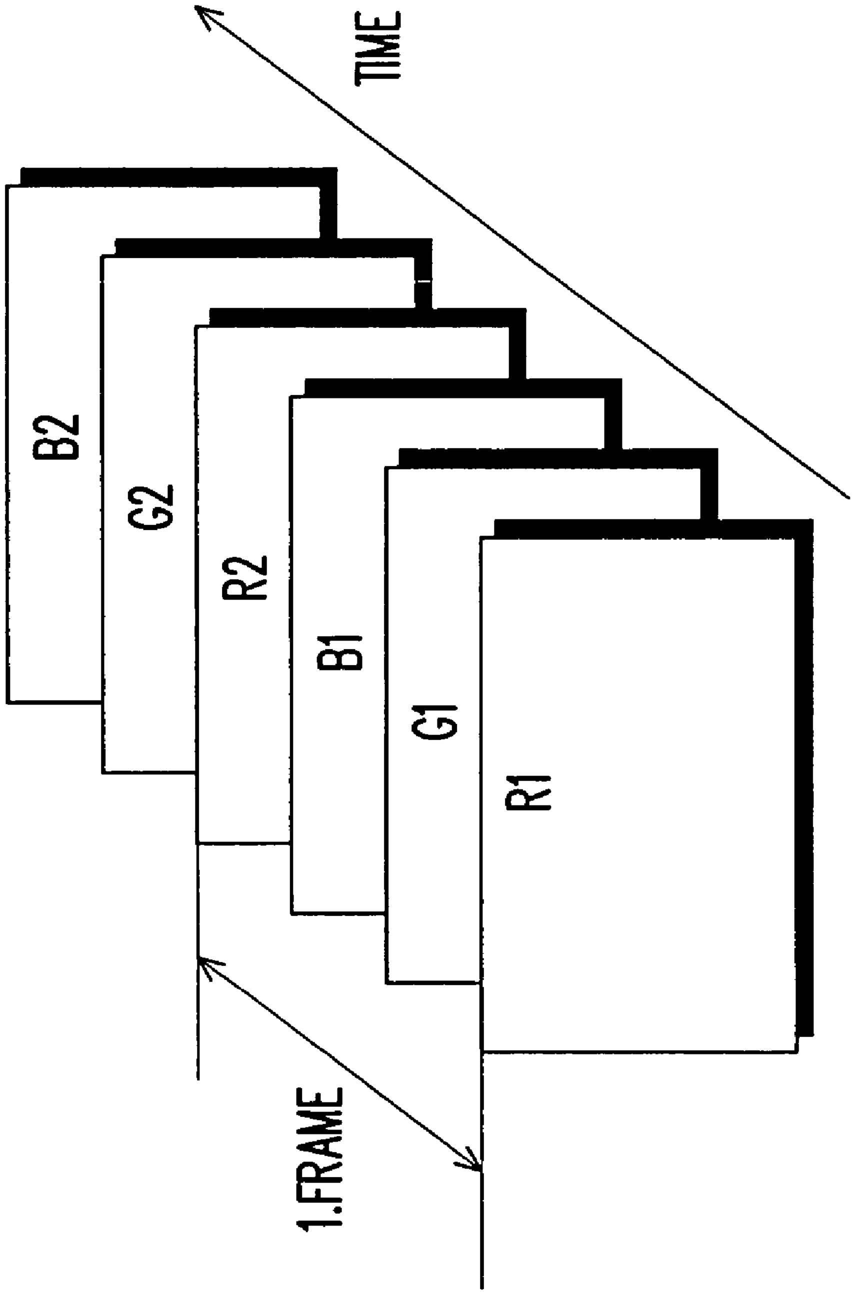
FIG. 1 (PRIOR ART)
FIG. 1 shows a conventional field-sequential color image display apparatus.

Reference will now be made in detail to the embodiment(s) (exemplary embodiments) of the disclosure, examples of which are illustrated in the accompanying drawings. Wherever possible, the same reference numbers will be used throughout the drawings to refer to the same or like parts.

There is disclosed a method of improving the color breakup phenomenon in a field-sequential color display. The proposed patterns, arranged according to a random color sequence, a quasi-random color sequence, or a predetermined color sequence, can significantly improve the color breakup phenomenon in a field-sequential color display.

In an embodiment, a proposed pattern for displaying an image over time in the disclosed field-sequential color display may be in a random color sequence. In another embodiment, a proposed pattern for displaying an image over time in the disclosed field-sequential color display may be in a quasi-random color sequence. In another embodiment, a proposed pattern for displaying an image over time in the disclosed field-sequential color display may be in a predetermined color sequence.

In the disclosed field-sequential color display, each frame or field may be temporarily divided into at least three color-separated sub-frames. By sequentially displaying these red, green, blue sub-frames fast enough, a full color image may be perceived. A plurality of color sequences for displaying an image over time in the disclosed field-sequential color display may be configured in advance for solving the problem of color breakup.

In the disclosed field-sequential color display, the color displaying sequence of the first frame may be different from the color displaying sequence of the second frame. Each frame can include three color sub-frames, for example, three primary color sub-frames, such as a red sub-frame, a green sub-frame, and a blue sub-frame.

In an embodiment, a proposed color sequence for displaying an image over time in the disclosed field-sequential color display may be in a random color sequence. For example, the color sequences for displaying image data over time may be "RGB GRB BGR RBG . . . ," which may be in a random sequence and not limited to a fixed, unchangeable sequence. That is, the red, green, blue sub-frames R, G, and B together may still constitute one frame or field, but, in each of the frames or fields for displaying the field-sequential color mode, the red, green, blue sub-frames R, G, and B may be arranged in a random sequence.

In another embodiment, a proposed color sequence for displaying an image over time in the disclosed field-sequential color display may be in a quasi-random color sequence. That is, the red, green, blue sub-frames R, G, and B together may still constitute one frame or field, but, in a portion of the frames or fields for displaying the field-sequential color mode, the red, green, blue sub-frames R, G, and B may be arranged in the random sequence, and in another portion of the frames or fields, the red, green, blue sub-frames R, G, and B may be arranged in a predetermined color sequence, which may depend on a predetermined design.

According to various embodiments, field-sequential color displays comprising a random or quasi-random color sequence can comprise a random number generator that can assign the random or quasi-random color sequence. Various random number generators can be used as will be known in the art. However, it is contemplated that other techniques, as will be know in the art, can be used to assign the random or quasi-random color sequence.

Figure 2:
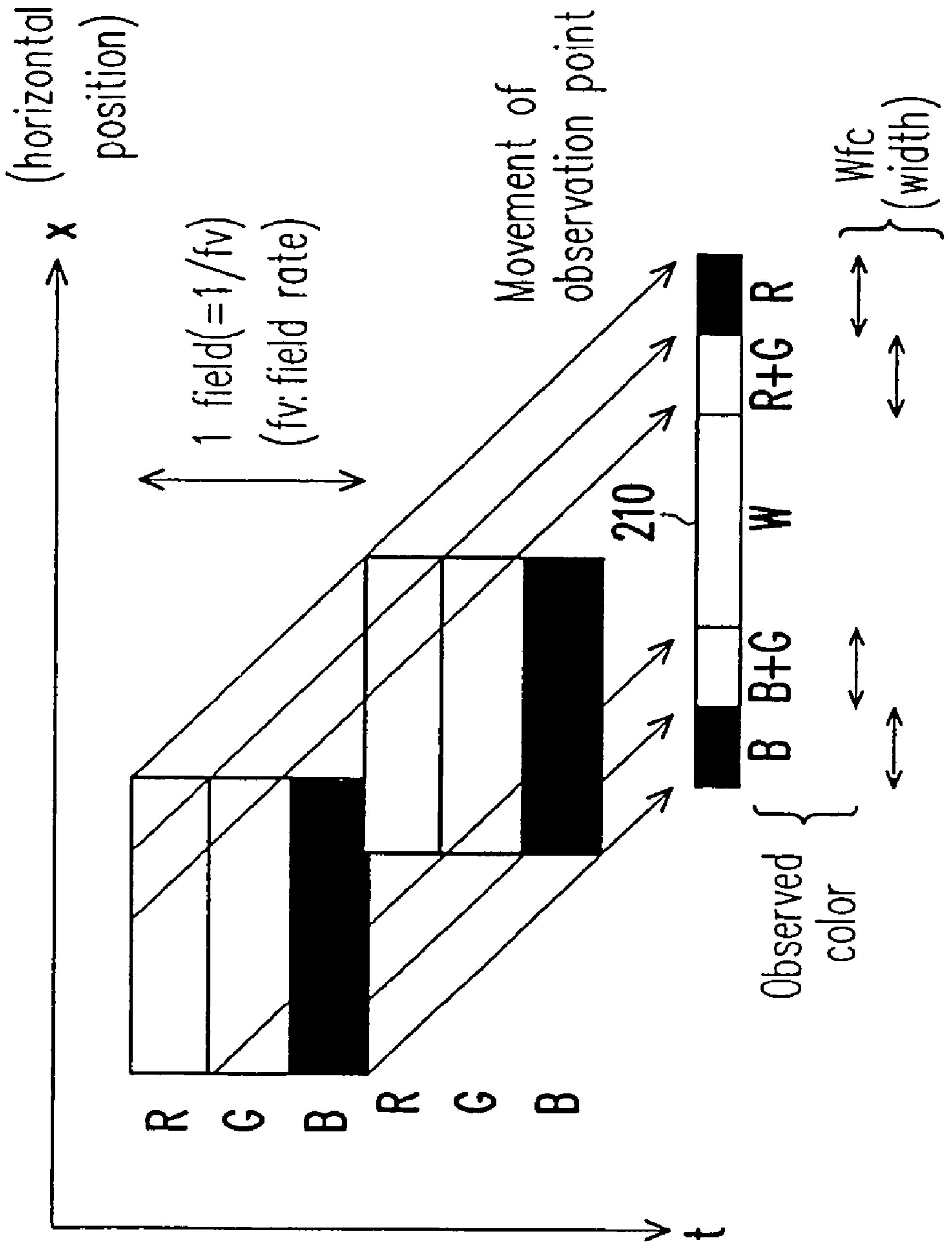
FIG. 2 (PRIOR ART)
FIG. 2 shows the conventional field-sequential color image display apparatus of FIG. 1 when the observation point is moved over time, the problem of color breakup may occur by the display pattern in the field-sequential color.
Figure 4:
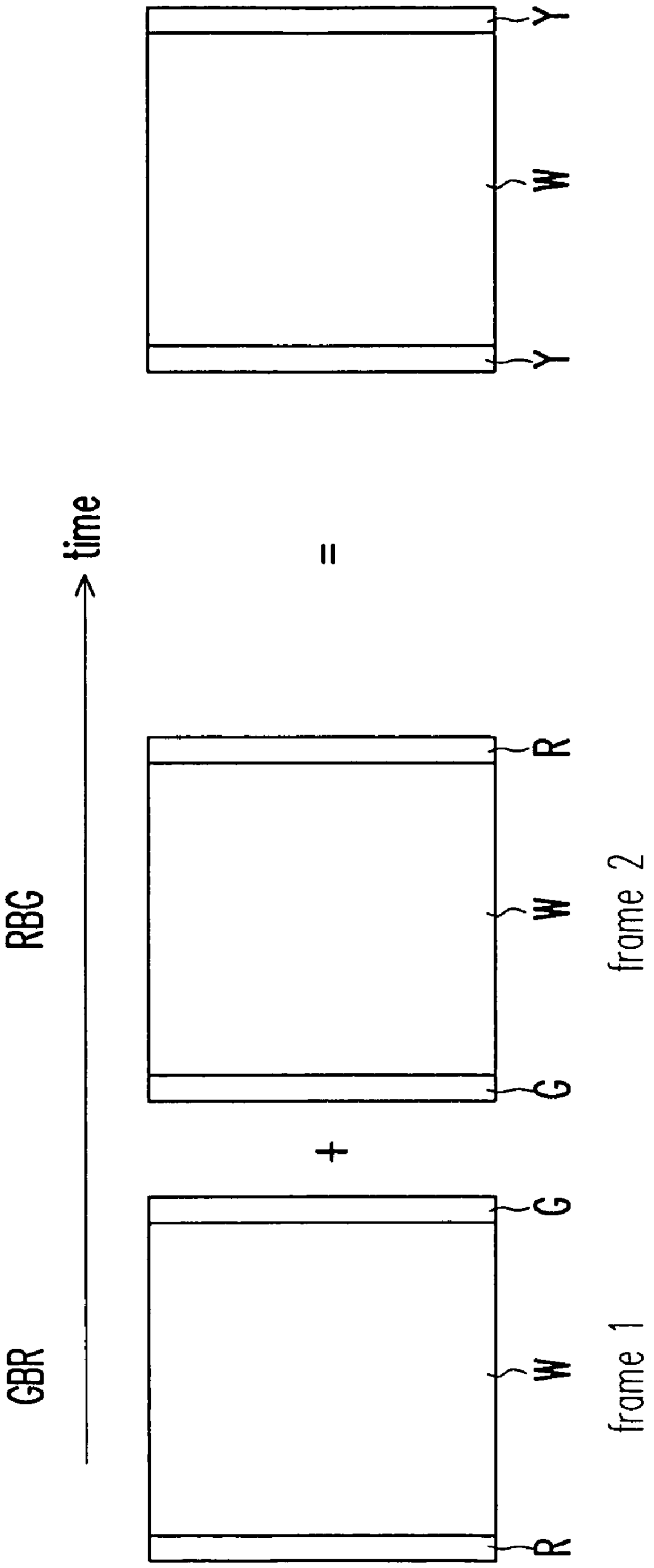
FIG. 4 shows another color sequence for displaying an image over time in the field-sequential color display according to another embodiment of the present invention.

In another embodiment, a proposed color sequence for displaying an image over time in the disclosed field-sequential color display may be in a predetermined desirable color sequence. For example, the first color displaying sequence and the second color displaying sequence may be repeated to give an image. That is, the color displaying sequence of every two frames or fields may be repeated. In the first frame of FIG. 4, for example, the displaying order of the red, green, blue sub-frames R, G, and B may be "GBR", and in the second frame, the displaying order of the red, green, blue sub-frames R, G, and B may be "RBG", and in the following two frames, the orders may be "GBR" and "RBG" respectively. In this way, using a moving white box image with a black background as an example, when a white image is required to be displayed, the white image may have yellow (Y) at both edges of the white image, as shown in FIG. 4. The yellow color at the edges may result from the color combination of R and G. In a conventional color sequential displaying method as described in FIG. 2, because red and blue are far from white, the red and blue at the edges of the white image is noticeable, and therefore not acceptable. In contrast, according to an embodiment, yellow at the edges of an image is much more acceptable to the eyes and therefore the color breakup phenomenon may be alleviated.

Alternatively, the color displaying sequence can first be RBG, then GBR, then RBG, then GBR . . . , that is, the first sequence (RBG) and the second sequence (GBR) may be repeated. Also, in this way, using a white image as an example, when a white image is required to be displayed, the white image has yellow at both edges of the white image and therefore the color breakup phenomenon may be alleviated.

Figure 3:
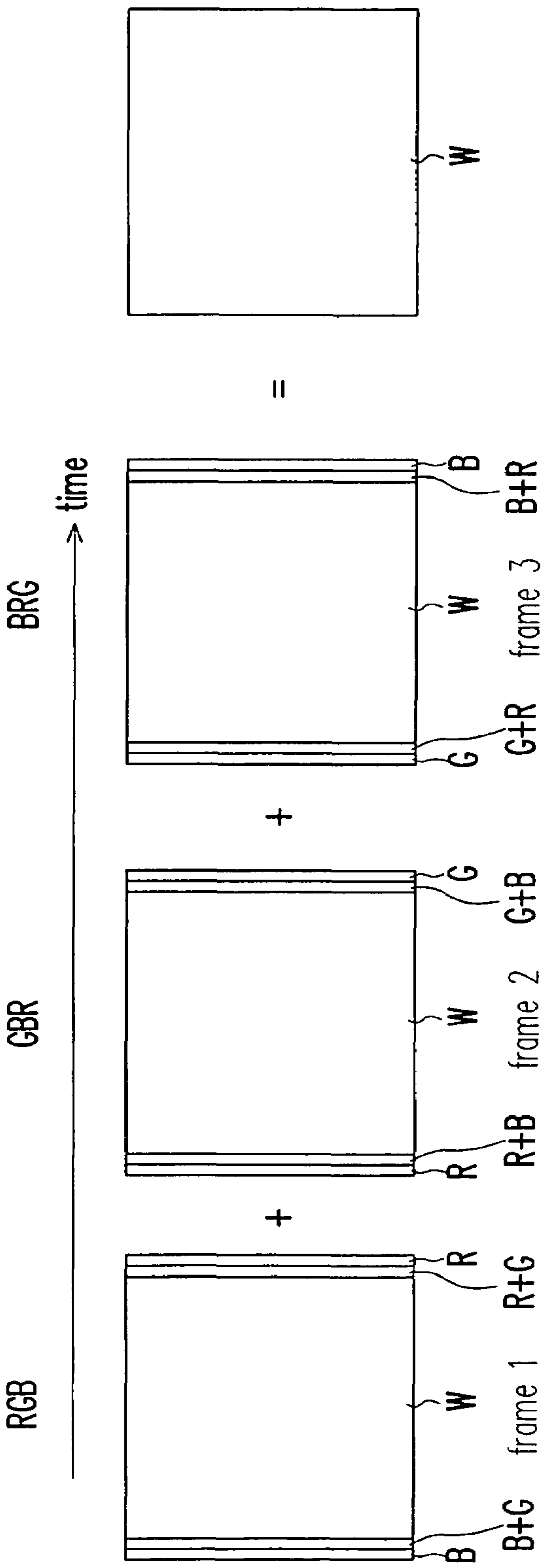
FIG. 3 shows a color sequence for displaying an image over time in the field-sequential color display according to an embodiment of the present invention.

According to another embodiment, in every three frames or fields, the red, green, blue sub-frames R, G, and B may be repeatedly displayed. In the first frame of FIG. 3, for example, the displaying order of the red, green, blue sub-frames R, G, and B may be "RGB", in the second frame, the displaying order of the red, green, blue sub-frames R, G, and B may be "GBR", and in the third frame, the displaying order may be "BRG". In the following three frames (not shown), the above sequences may be repeated, that is, "RGB", then "GBR", and then "BRG". In this way, using a white image as an example, when a white image is required to be displayed, the resultant white image has a white color at both edges of the white image, as shown in FIG. 3. This white color at the edges may result from the color combination of R, G and B, and therefore the color breakup phenomenon may be alleviated.

Other embodiments will be apparent to those skilled in the art from consideration of the specification and practice of the disclosed invention. It is intended that the specification and examples be considered as exemplary only, with a true scope and spirit of the disclosure being indicated by the following claims.

What is claimed is:

1. A method for displaying an image comprising:

receiving a plurality of frames corresponding to an image data, wherein each of the plurality of frames comprises a plurality of color sub-frames;

sequentially displaying the color sub-frames corresponding to a first frame in a first color sequence over time; and displaying the sub-frames corresponding to a second frame following the first frame in a second color sequence over time, wherein the first color sequence is different from the second color sequence, and the first color sequence and the second color sequence are arranged to repeat every two frames of the plurality of frames.

2. The method of claim 1, wherein each of the plurality of frames comprises a red sub-frame, a green sub-frame and a blue sub-frame.

3. The method of claim 2, wherein the red sub-frame, the green sub-frame, and the blue sub-frame are arranged so that the first color sequence is green-blue-red, and the second color sequence is red-blue-green.

4. The method of claim 2, wherein the red sub-frame, the green sub-frame, and the blue sub-frame are arranged so that the first color sequence is red-blue-green, and the second color sequence is green-blue-red.

5. A method for displaying an image comprising:

receiving a plurality of frames corresponding to an image data, wherein each of the plurality of frames comprises a plurality of color sub-frames;

sequentially displaying the color sub-frames corresponding to a first frame in a first color sequence over time;

displaying the sub-frames corresponding to a second frame following the first frame in a second color sequence over time, wherein the first color sequence is different from the second color sequence; and sequentially displaying the sub-frames corresponding to a third frame following the second frame in a third color sequence over time, wherein the third color sequence is different from the first color sequence and the second color sequences, and wherein the first color sequence, the second color sequence, and the third color sequence are arranged to repeat every three frames of the plurality of frames.

6. The method of claim 5, wherein each of the plurality of frames comprises a red sub-frame, a green sub-frame and a blue sub-frame.

7. The method of claim 6, wherein the red sub-frame, the green sub-frame, and the blue sub-frame are arranged so that the first, second, and third color sequences are a combination of red-green-blue, green-blue-red, and blue-red-green.

8. The method of claim 7, wherein the red sub-frame, the green sub-frame, and the blue sub-frame are arranged so that the first color sequence is red-green-blue, the second color sequence is green-blue-red, and the third color sequence is blue-red-green.

9. A method for improving color breakup comprising:

sequentially displaying a plurality of frames in a field-sequential color display, each frame comprising a red sub-frame, a blue sub-frame, and a green sub-frame, wherein the color sub-frames in each frame are displayed in a random color sequence.

10. A method for improving color breakup comprising:

sequentially displaying a plurality of frames in a field-sequential color display, each frame comprising a red sub-frame, a blue sub-frame, and a green sub-frame, wherein the color sub-frames in each frame are displayed in a predetermined color sequence, wherein the predetermined color sequence is one of:

green-blue-red sub-frames followed by red-blue-green sub-frames, or red-blue-preen sub-frames followed by green-blue-red sub-frames, or red-green-blue sub-frames followed by green-blue-red sub-frames followed by blue-red-green sub-frames.

11. The method of claim 10, wherein the predetermined color sequence is green-blue-red sub-frames followed by red-blue-green sub-frames.

12. The method of claim 10, wherein the predetermined color sequence is red-blue-green sub-frames followed by green-blue-red sub-frames.

13. The method of claim 10, wherein the predetermined color sequence is red-green-blue sub-frames followed by green-blue-red sub-frames followed by blue-red-green sub-frames.

14. The method of claim 9, wherein the random color sequence in the field-sequential color display is generated by a random number generator.

15. The method of claim 9, wherein the random color sequence in the field-sequential color display is a quasi-random color sequence.

* * * * *